US009646230B1

(12) United States Patent
Prulhiere et al.

(10) Patent No.: US 9,646,230 B1
(45) Date of Patent: *May 9, 2017

(54) IMAGE SEGMENTATION IN OPTICAL CHARACTER RECOGNITION USING NEURAL NETWORKS

(71) Applicant: David Prulhiere, Grants Pass, OR (US)

(72) Inventors: David Prulhiere, Grants Pass, OR (US); Terence Bonita, Cebu (PH)

(73) Assignee: David Prulhiere, Grants Pass, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,926

(22) Filed: Jun. 6, 2016

Related U.S. Application Data

(63) Continuation of application No. 14/735,556, filed on Jun. 10, 2015, now Pat. No. 9,378,435.

(Continued)

(51) Int. Cl.
*G06K 9/00* (2006.01)
*G06K 9/66* (2006.01)
(Continued)

(52) U.S. Cl.
CPC .............. *G06K 9/66* (2013.01); *G06K 9/18* (2013.01); *G06K 9/4604* (2013.01);
(Continued)

(58) Field of Classification Search
CPC .. G06K 2209/01; G06K 9/32; G06K 9/00463; G06K 9/325; G06K 9/38; G06K 9/50; G06K 9/00402; G06K 9/00483; G06K 9/6256; G06K 9/66; G06K 9/00221; G06K 9/00288; G06K 9/4671; G06K 9/6211; G06K 9/6269; G06K 9/0063; G06K 9/6251; G06F 17/40; G06F 3/005; G06F 17/30011; G06F 2221/2115; G06F 2221/2129;
(Continued)

(56) References Cited

U.S. PATENT DOCUMENTS 5,054,094 A * 10/1991 Barski ............... G06K 9/46
382/192
5,271,068 A * 12/1993 Ueda .................. G06K 9/4609
382/156
(Continued)

OTHER PUBLICATIONS

Non-Final Office Action, U.S. Appl. No. 14/735,556, Oct. 30, 2015, 24 pages.
(Continued)

*Primary Examiner* — Vu Le
*Assistant Examiner* — Aklilu Woldemariam
(74) *Attorney, Agent, or Firm* — Klarquist Sparkman, LLP

(57) ABSTRACT

Neural-network-based image segmentation techniques are provided herein. An input image that includes a plurality of characters can be received. Boundaries between the characters can be identified using a trained neural network. The input image can be segmented along the boundaries identified between the characters. The neural network can be trained using a training image and a training target vector. The training target vector can indicate one or more boundaries between characters in the training image. Neural-network-based segmentation can be used alone or in conjunction with other segmentation techniques to improve overall segmentation accuracy.

20 Claims, 11 Drawing Sheets

Related U.S. Application Data

(60) Provisional application No. 62/010,375, filed on Jun. 10, 2014.

(51) Int. Cl.
*G06T 7/00* (2017.01)
*G06K 9/62* (2006.01)
*G06K 9/18* (2006.01)
*G06K 9/46* (2006.01)

(52) U.S. Cl.
CPC ......... *G06K 9/6202* (2013.01); *G06K 9/6256* (2013.01); *G06T 7/0087* (2013.01); *G06K 9/00* (2013.01)

(58) Field of Classification Search
CPC ......... G06T 2207/30176; G06T 7/0079; G06T 7/0083; G06T 11/206; H04N 1/3878; G02B 27/0093; G02B 27/0149; G02B 6/12019; G06N 3/02; H04L 29/12066; H04L 61/1511; H04L 63/08; H04L 63/0884; H04L 63/1441; H04L 63/1466; G01S 13/955; G01S 7/12; G01S 7/417; G01N 27/447
USPC ..... 382/102, 112, 159, 176, 199, 18, 36, 34, 382/156, 224, 305
See application file for complete search history.

(56) References Cited

U.S. PATENT DOCUMENTS

| | | | | |
|---|---|---|---|---|
| 5,299,269 | A | | 3/1994 | Gaborski et al. |
| 5,337,370 | A | * | 8/1994 | Gilles ................. G06K 9/6292 382/102 |
| 5,542,006 | A | * | 7/1996 | Shustorovich ........... G06K 9/32 382/156 |
| 5,604,823 | A | * | 2/1997 | Ono ................... G06K 9/00268 382/156 |
| 5,633,954 | A | * | 5/1997 | Gupta ................. G06K 9/3283 382/187 |
| 5,712,922 | A | * | 1/1998 | Loewenthal ......... G06K 9/2036 382/155 |
| 5,912,986 | A | * | 6/1999 | Shustorovich ........... G06K 9/32 382/156 |
| 6,021,220 | A | * | 2/2000 | Anderholm .......... G06K 9/2054 382/194 |
| 6,028,956 | A | * | 2/2000 | Shustorovich ....... G06K 9/3233 382/156 |
| 6,243,501 | B1 | | 6/2001 | Jamali |
| 6,614,930 | B1 | * | 9/2003 | Agnihotri .............. G06K 9/325 382/173 |
| 7,454,371 | B2 | | 11/2008 | Wyle et al. |
| 7,610,227 | B2 | | 10/2009 | Wyle |
| 7,636,886 | B2 | | 12/2009 | Wyle et al. |
| 7,720,616 | B2 | | 5/2010 | Wyle et al. |
| 7,769,646 | B2 | | 8/2010 | Wyle |
| 7,853,494 | B2 | | 12/2010 | Wyle |
| 8,655,075 | B2 | | 2/2014 | Wyle et al. |
| 8,855,375 | B2 | * | 10/2014 | Macciola ............... H04N 1/387 358/448 |
| 8,897,563 | B1 | * | 11/2014 | Welling ............. G06K 9/00442 382/173 |
| 2002/0164070 | A1 | * | 11/2002 | Kuhner ................ G06K 9/6254 382/159 |
| 2006/0251339 | A1 | * | 11/2006 | Gokturk ............ G06F 17/30253 382/305 |
| 2008/0301070 | A1 | * | 12/2008 | Bartlett ................ G06K 9/6215 706/12 |
| 2008/0310721 | A1 | * | 12/2008 | Yang .................... G06K 9/3275 382/182 |
| 2009/0074288 | A1 | * | 3/2009 | Nishida .............. G06K 9/00456 382/159 |
| 2009/0202144 | A1 | * | 8/2009 | Taub .................... G06K 9/6256 382/156 |
| 2010/0310172 | A1 | * | 12/2010 | Natarajan .......... G06K 9/00865 382/187 |
| 2011/0249905 | A1 | * | 10/2011 | Singh ................. G06K 9/00449 382/225 |
| 2011/0258195 | A1 | * | 10/2011 | Welling ............. G06K 9/00442 707/740 |

OTHER PUBLICATIONS

Notice of Allowance, U.S. Appl. No. 14/735,556, Mar. 1, 2016, 10 pages.

\* cited by examiner

IMAGE SEGMENTATION IN OPTICAL CHARACTER RECOGNITION USING NEURAL NETWORKS

CROSS-REFERENCE TO RELATED APPLICATION

This is a continuation of U.S. patent application Ser. No. 14/735,556, filed Jun. 10, 2015, and titled "IMAGE SEGMENTATION IN OPTICAL CHARACTER RECOGNITION USING NEURAL NETWORKS," which claims the benefit of U.S. Provisional Application No. 62/010,375 filed on Jun. 10, 2014 and titled "HYBRID SEGMENTER AND SEGMENTATION IN OPTICAL CHARACTER RECOGNITION USING NEURAL NETWORKS," both of which are incorporated herein by reference in their entirety.

FIELD

The present disclosure relates to segmentation in optical character recognition.

BACKGROUND

Segmentation in optical character recognition (OCR) typically involves extracting individual characters from an image comprising more than one character. Segmentation accuracy can affect the output accuracy of OCR systems.

Some conventional segmentation techniques involve determining cross-correlation of an image with a kernel, similar to histogram-based methods. Such techniques can be ineffective, however, in situations where an input image has a significant amount of noise between characters. Other conventional techniques involve using a sliding window running across the image, testing whether the portion of the image within the window represents a known target character or a non-character. These methods can be ineffective, however, in situations where the font set is not known in advance.

SUMMARY

The examples described herein segment images using neural-network-based segmentation approaches. In the described examples, an input image comprising a plurality of characters can be received. A boundary between two of the plurality of characters can be identified using a trained neural network. The input image can be segmented at the boundary identified between the two characters. The neural network can be trained using a training image and a training target vector. The training target vector can indicate one or more boundaries between characters in the training image.

Neural-network-based segmentation can be used in conjunction with other segmentation techniques. For example, hybrid segmentation techniques can involve using a first segmentation analyzer to segment an image and generate multiple image portions. A maximum width comparator can be used to determine, for individual image portions, if a width of the image portion exceeds a threshold. For image portions whose width exceeds threshold, a neural-network-based segmentation analyzer can be used to identify a boundary between characters in the image portion and segment the image portion at the boundary.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

The examples described herein use trained neural networks to segment images. A "neural network" refers to a computational model implemented on one or more computing devices and inspired by animals' central nervous systems (e.g., the brain) that are capable of machine learning and pattern recognition. Neural networks can be presented as systems of interconnected neurons that can compute values from inputs by feeding information through the network.

The described examples of neural-network-based image segmentation are an advance to the fields of optical character recognition and image processing. The described examples provide better segmentation accuracy than conventional approaches, reducing the need for re-processing of images and saving both computing processing resources and network bandwidth. Segmentation accuracy is vital to satisfy the new demand for computationally efficient and accurate image processing, document processing, and file format conversions that have specifically arisen with the advent of cloud storage and Internet-based services. Examples of image segmentation using trained neural networks are described below with reference to FIGS. 1-11.

Figure 1:
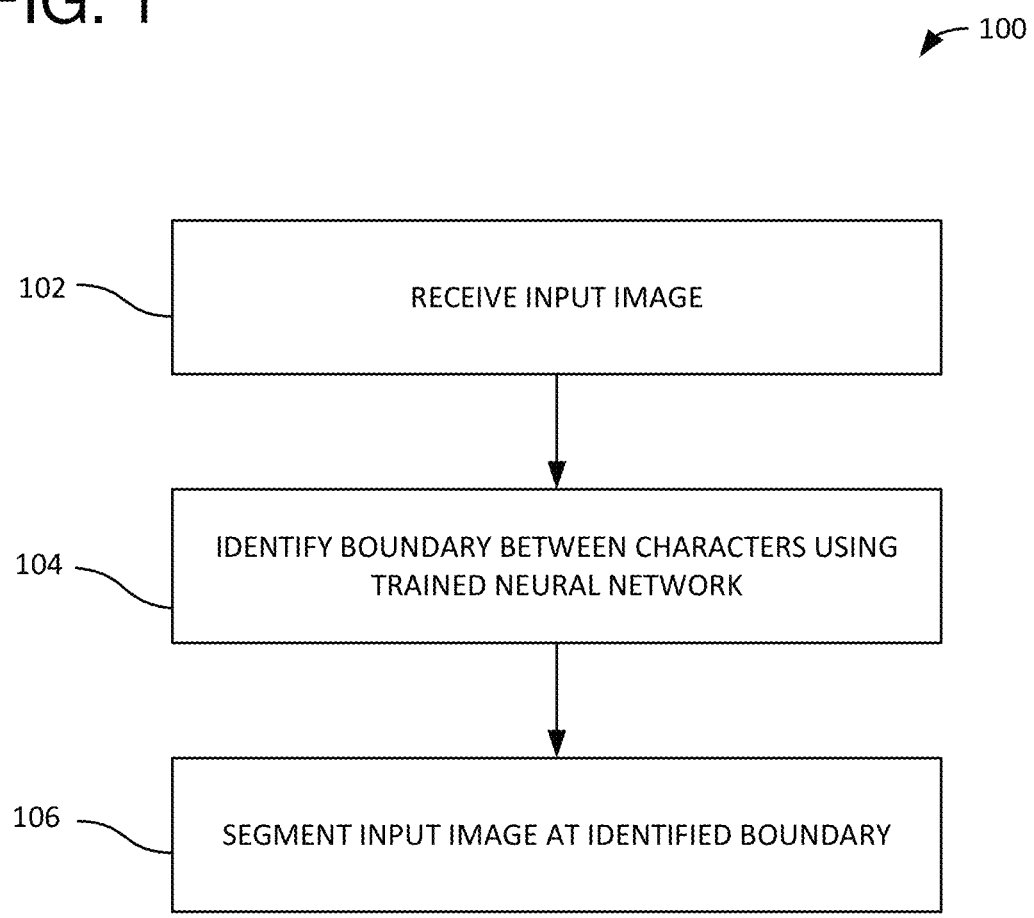
FIG. 1 illustrates an example method of neural-network-based image segmentation.

FIG. 1 illustrates a method 100 of neural-network-based image segmentation. In process block 102, an input image comprising a plurality of characters is received. The input image can have a variety of file formats, including bitmap, jpeg, tagged image file format (TIFF), portable document format (PDF), graphics interchange format (GIF), portable network graphics (PNG) format, raw format, or other format. The plurality of characters can include letters, numbers, symbols, or other character. The input image can be generated using an optical scanner, a camera, or other optical sensor. In process block 104, a boundary between two of the plurality of characters is identified using a trained neural network.

The neural network can be trained at least in part based on a training image and a training target vector. The training target vector can indicate one or more boundaries between characters in the training image. The training target vector can include values for a plurality of locations within the training image. In some examples, if a location of the plurality of locations is one of (i) a start of a next character or (ii) a boundary between characters, the corresponding value is a first predetermined value (e.g. "1"), and if a location of the plurality of locations is not one of (i) a start of a next character or (ii) a boundary between characters, the corresponding value is a value other than the first predetermined value (e.g. "0," "−1," or other value). Training of the neural network is discussed in detail with respect to FIG. 4.

In process block 106, the input image is segmented at the boundary identified between the two characters. In an x-y coordinate system, for example, the boundary can be an x location in the image (also referred to as a segmentation point) between the two characters or a vertical line extending in the y direction from the x location, and segmentation can be along the vertical line.

The segmentation can create an image portion containing one of the two characters. The image portion can include, for example, portions of white space or background area above, below, and/or on either side of the character. In some examples, method 100 further comprises extracting a value for the character from the image portion and generating a document including a text representation of the character in a position corresponding to the image portion's position within the input image. Extraction of a value for the character can be done, for example, using OCR techniques to recognize a pixel configuration as a character. The generated document can be, for example, a word processing document, PDF document, or other document in which the text representation can be searched for and located using non-OCR techniques (e.g., by entering text into a search tool while viewing the document). In some examples, segmentation can create metadata, a data file, or other format of descriptive data indicating the locations of boundaries between characters in the input image. Such metadata or file can be stored in association with the input image.

Figure 2:
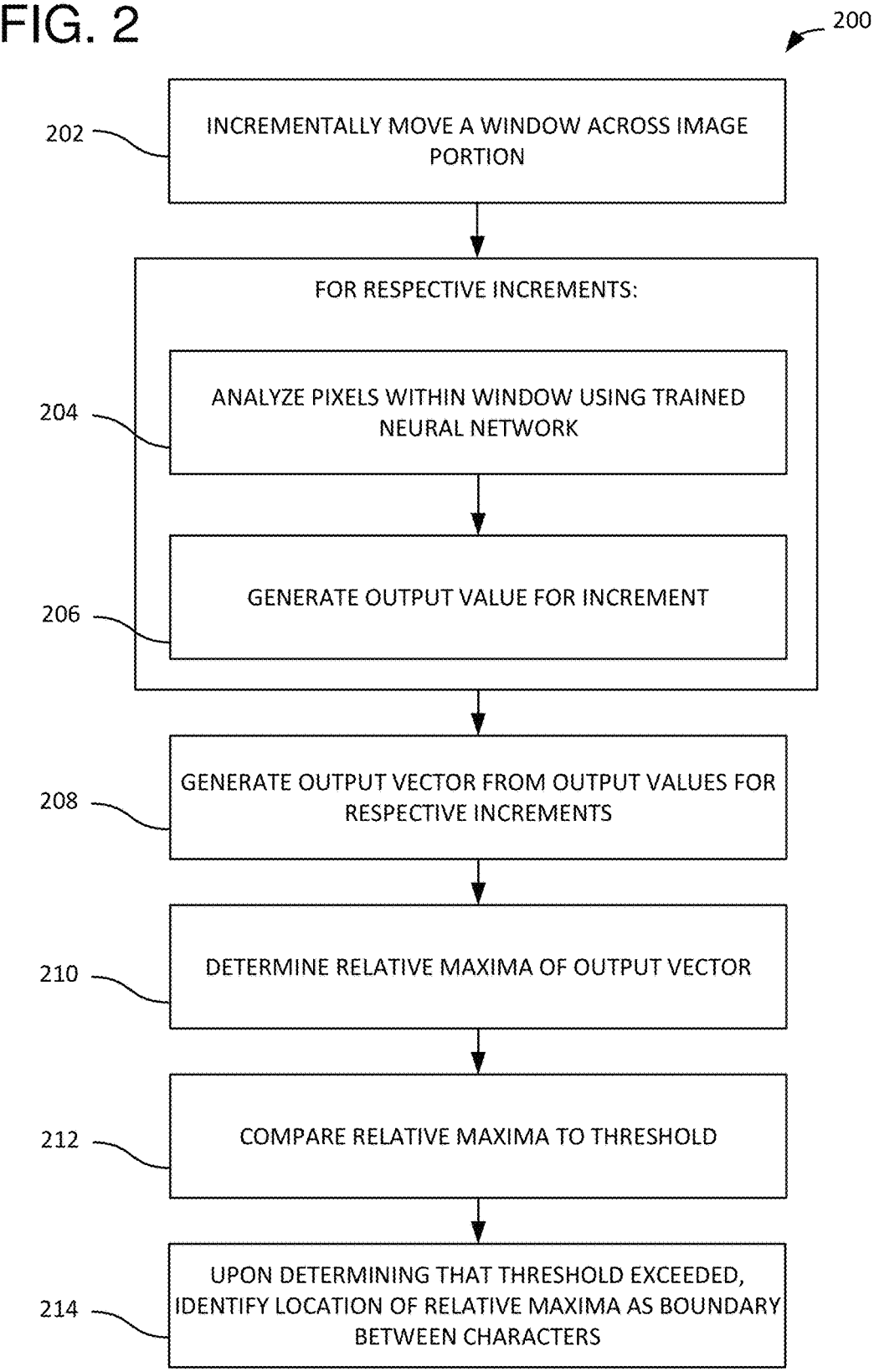
FIG. 2 illustrates an example method of identifying boundaries between characters using a trained neural network.

FIG. 2 illustrates a method 200 of identifying boundaries between characters using a trained neural network. Method 200 can be performed, for example, as part of process block 104 of method 100. In process block 202, a window is moved incrementally across an input image in a plurality of steps or increments. Process blocks 204 and 206 are performed for the respective steps. In process block 204, pixels within the window are analyzed using the trained neural network. In process block 206, an output value for the increment is generated. The output value can be generated using the neural network. In process block 208, an output vector is generated from the output values for the respective increments. For example, the output vector can be formed by serializing the output values for the respective increments. One or more relative maxima of the generated output vector are determined in process block 208. Relative maxima can be determined, for example, by taking a first derivative of the output vector and identifying locations where the first derivative equals zero. In process block 210, the one or more relative maxima are compared to a threshold. In other examples, all values of the output vector can be compared to the threshold. The threshold can be predetermined or user selected and can be automatically adjusted, for example, based on user feedback as more images are segmented. In process block 212, upon determining that one of the one or more relative maxima meets or exceeds the threshold, the location of the relative maxima is identified as the boundary between the characters.

The analysis of pixels within the window using the trained neural network in process block 204 can include creating an input vector representing the pixels within the window and providing the input vector to the trained neural network. In some examples, the window is an m×n pixel submatrix of pixels, the input vector is a 1×(m*n) array of pixels. This is illustrated in FIG. 3.

Figure 3:
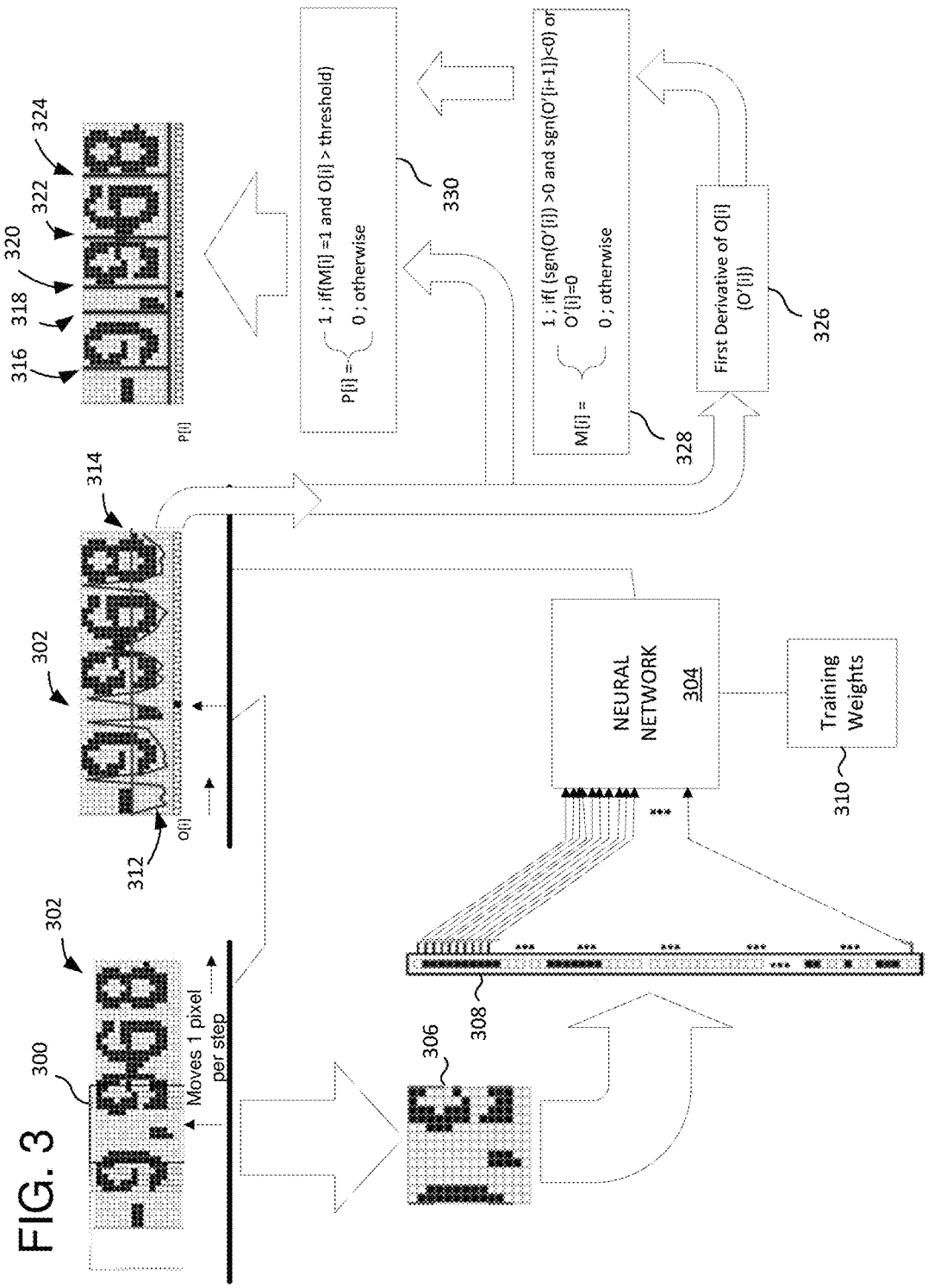
FIG. 3 illustrates a detailed example of segmentation using a neural network.

FIG. 3 illustrates a detailed example of segmentation using a neural network. A window 300 moves in steps of one pixel across input image 302. Other step sizes are also possible (e.g., two, three, five, ten pixels, etc.). Input image 302 can be an entire image or a portion of a larger image. In FIG. 3, window 300 is an m×n pixel window, where m is the number of pixels in width and n is the number of pixels in height. Window 300 moves from left to right. For each step, the contents of window 300 are provided to trained neural network 304. For example, for the current location of window 300 shown in FIG. 3, the contents 306 of window 300 are provided to neural network 304. The m×n submatrix of pixels within window 300 can be converted to a 1×(m*n) input vector 308 for input to neural network 304. Input vector 308 thus includes all of the pixels included in the submatrix but organized into a one-dimensional array rather than a matrix. The submatrix can be converted into various other formats prior to being provided to neural network 304. In some examples, the submatrix itself is provided to neural network 304.

Figure 4:
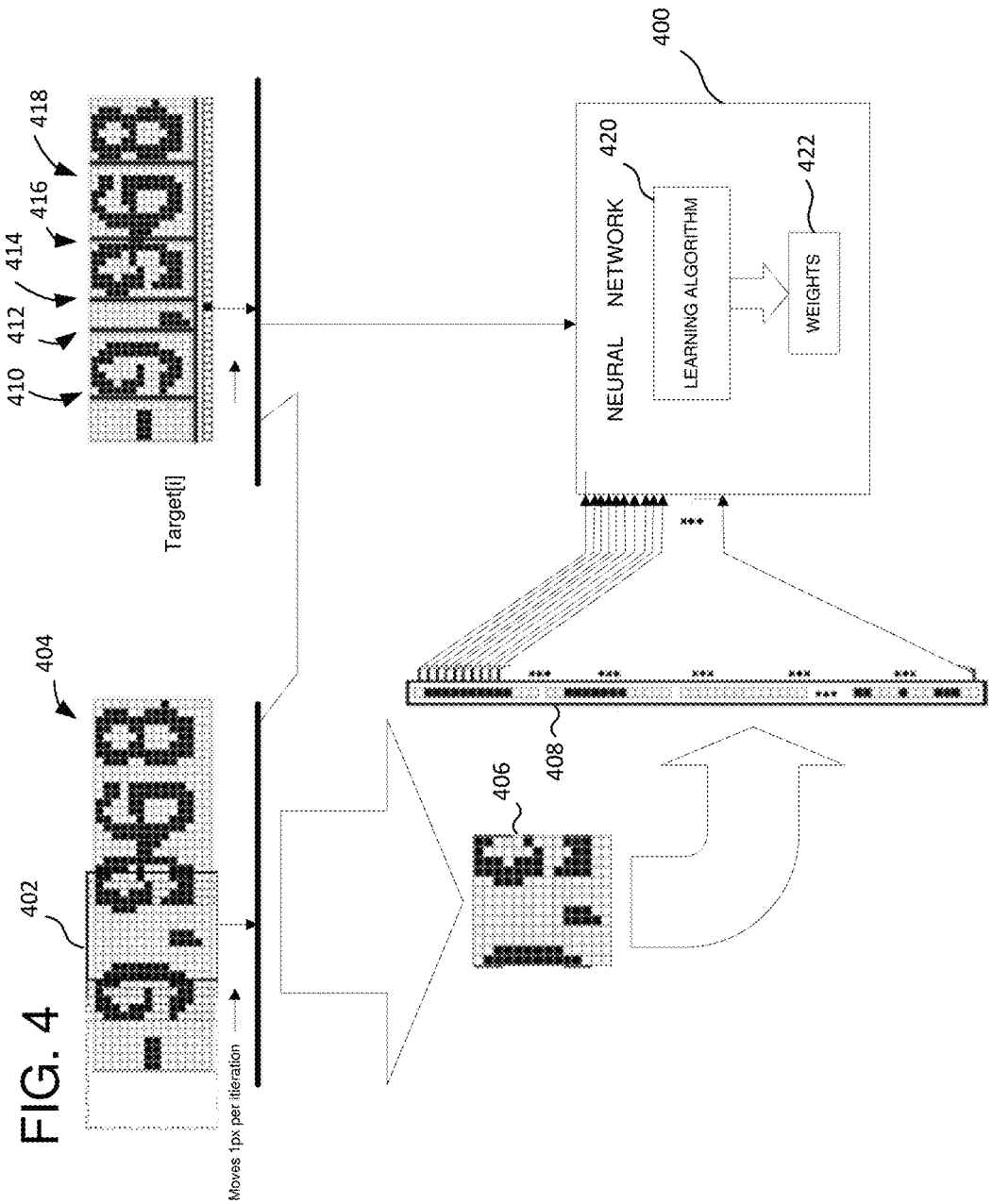
FIG. 4 illustrates an example of training a neural network for image segmentation.

Neural network 304 analyzes the contents 306 of window 300 (e.g., analyzes input vector 308) using weighting values obtained through the training process. For example, neural network 304 can access training weights 310 that were determined and saved during the training process. Training weights 310 can be updated as additional input images are analyzed by neural network 304. An example training process is illustrated in FIG. 4.

Neural network 304 generates an output value 312 (O[i]) for each i value (where i is a horizontal or x-location). The output values generated for the respective increments as window 300 traverses the input image 302 together form an output vector (O). A graphical representation 312 of the output vector is shown superimposed on input image 302. As illustrated in FIG. 3, the graphical representation 312 of the output vector has peaks (relative maxima) in columns where no black pixels are present. Neural network 304 can, for example, detect noise between two characters (e.g., a small number of black pixels connecting two characters) and reflect this detection in the values of the output function. For example, graphical representation 312 of the output vector reaches relative maxima in four locations where no black pixels are present. There are five black pixels between the "9" and "6" in input image 302 that make the 9 and 6 appear to be one character. Based on the training image(s) and training target vector(s) used to train neural network 304, it can be determined that these connecting pixels are noise, and a higher output value of can be provided for this i location. The height of a particular output value can reflect a confidence that the pixels are noise at the corresponding i location. As shown in FIG. 3, for example, the relative maximum between the 9 and the 6 is lower than the other relative maxima, indicating a lower confidence that the corresponding location is a boundary.

The relative maxima are compared to a threshold 314. In some examples, all values of the output vector can be compared to the threshold. FIG. 3 shows five relative maxima, and each of the relative maxima are above threshold 314. The locations of the five relative maxima that meet or exceed the threshold are identified as boundaries 316, 318, 320, 322, and 324. Image 302 can then be segmented along boundaries 316, 318, 320, 322, and 324, and characters within the respective segmented portion can be identified using, for example, OCR techniques.

In FIG. 3 the process of identifying relative maxima, comparing to a threshold, and identifying boundaries is illustrated using blocks 326, 328, and 330. Block 326 illustrates the first derivative of the output vector O'[i]. The function M[i], shown in block 328 represents relative maxima, where for each i value, a 1 is determined if either (a) the sign (+/−) of the first derivative of the output vector at i is positive and the sign of the first derivative of the output vector at i+1 is negative (indicating an increasing function at i and a decreasing function at i+1, with a relative maximum between i and i+1) or (b) the first derivative is zero (indicating no change in the output vector and a relative maximum). The function P[i] shown in block 330, represents the boundaries, where a value of 1 is determined if a maximum has been detected and the output vector at that i value exceeds the threshold and 0 otherwise.

FIG. 4 illustrates an example of training a neural network 400. Similar to FIG. 3, an m×n pixel window 402 is moved incrementally across a training image 404. Contents 406 of window 402 at a particular step are converted to an input vector 408 and provided to neural network 400. A training target vector is also provided to neural network 400. The training target vector is pre-determined from training image 404 and reflects pre-determined boundaries 410, 412, 414, 416, and 418 between characters in training image 404. In some examples, a single training target vector is provided that indicates all boundaries for training image 404. In other examples, a training target vector is determined that corresponds to the contents of particular locations of window 402. In some examples, neural network 400 is trained using window positions of window 402 that incrementally span training image 404, along with corresponding training target vector(s). In other examples, the contents of certain window locations (and corresponding training target vectors) are used, where the window locations correspond to known noise, boundaries, or other features neural network 400 is learning.

Neural network 400 can use one or more learning algorithms 420 to develop a set of weights 422 for interpreting input images. Weights 422 are saved for use with non-training images. Various learning algorithms 420 and weight 422 can include various examples known to those of skill in the art can be used. In some examples, learning algorithms 420 comprise a backpropagation approach, delta rule/gradient descent approach, perceptron learning approach, or other approach.

Figure 5:
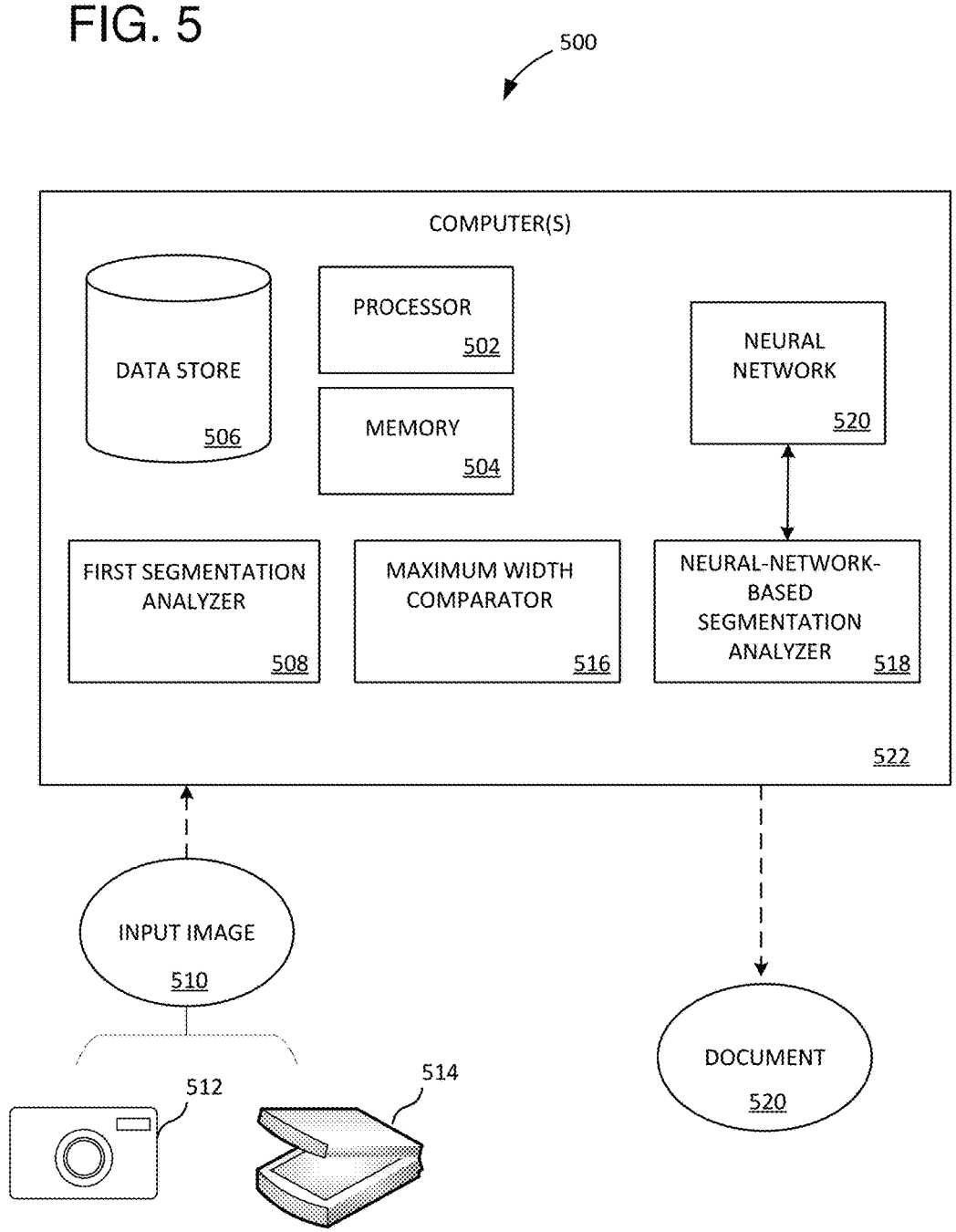
FIG. 5 illustrates an example image segmentation system.
Figure 7:
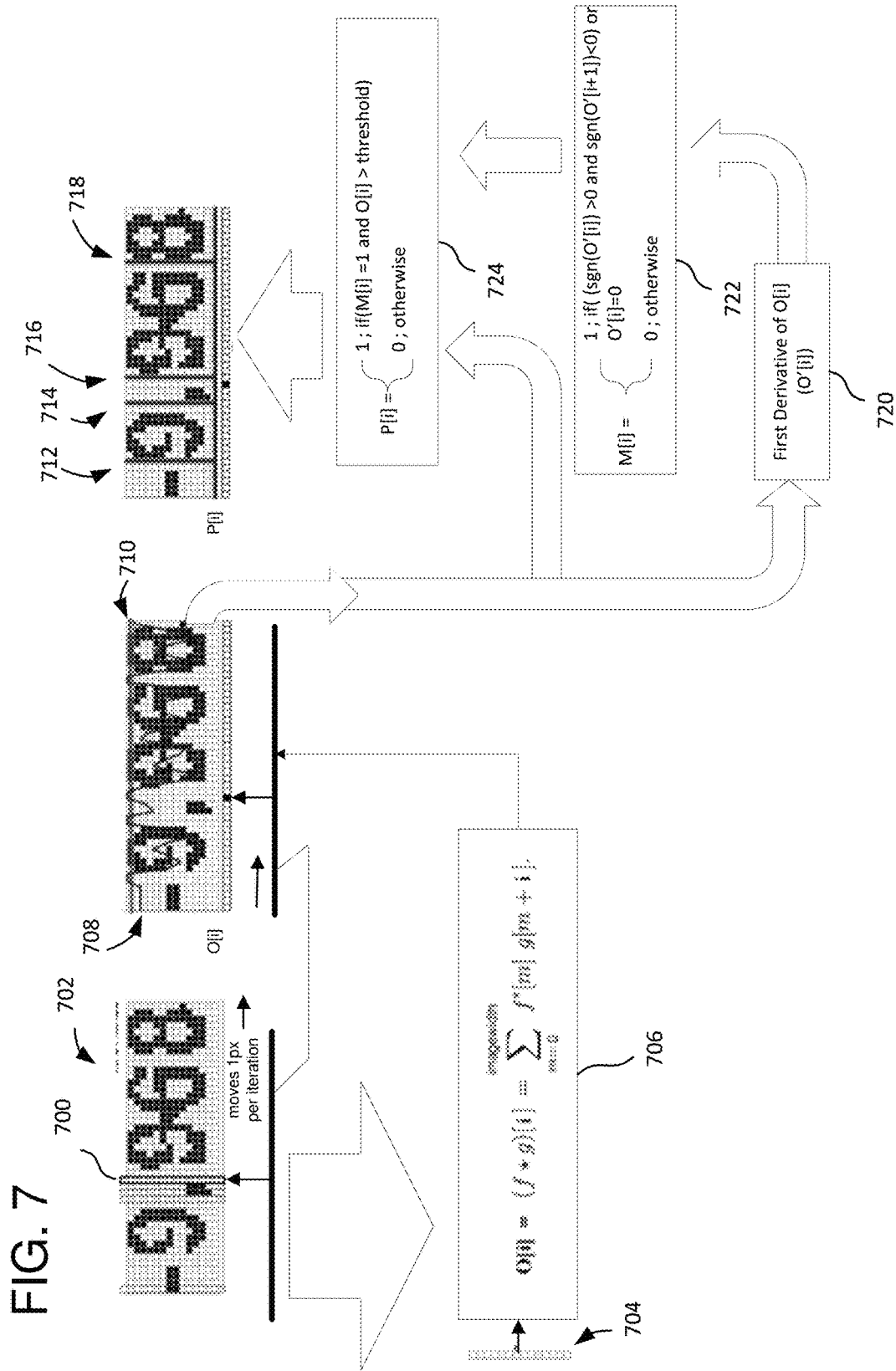
FIG. 7 illustrates an example image segmentation technique using cross correlation.

FIG. 5 illustrates an image segmentation system 500. Image segmentation system 500 includes a processor 502, a memory 504, and a data store 506. A first segmentation analyzer 508 is configured to, by processor 502, segment an input image stored in memory 504 or data store 506 and generate a plurality of image portions. The input image can be an input image such as input image 510 that is generated by a digital camera 512, optical scanner 514, or other optical sensor. Optical scanner 514 can be configured to scan a hard copy input document and generate the input image. First segmentation analyzer 508 can be a neural-network-based segmentation analyzer, a cross-correlation based segmentation analyzer that segments an input image based on a cross-correlation between a blank moving window and the input image, or another type of segmentation analyzer. An example cross-correlation-based segmentation analyzer is illustrated in FIG. 7.

A maximum width comparator 516 is configured to determine, by processor 502 and for the respective image portions, if a width of the image portion exceeds a threshold. The threshold can be selected, for example, to be an expected maximum width of one character. In such examples, an image portion that exceeds the threshold is larger than the expected maximum width of one character and is likely to contain multiple characters. This indicates that the image portion may not have been properly or completely segmented by first segmentation analyzer 508.

A neural-network-based segmentation analyzer 518 is configured to, by processor 502, further analyze the respective image portions for which it is determined that the width of the image portion exceeds the threshold. Neural-network-based segmentation analyzer 518 is configured to: identify a boundary between characters in the image portion using trained neural network 520; segment the image portion at the boundary identified between the characters; and generate additional image portions corresponding to the segmented image portion. In some examples, neural-network-based segmentation analyzer 518 is configured to determine an absolute maximum of an output function for the image portion and identify the location of the absolute maximum as a segmentation point for the image portion.

For example, neural-network-based segmentation analyzer 518 can be configured to identify the boundary between characters in the image portion by: incrementally moving a window across the image portion, and, for respective increments: analyzing pixels within the window using trained neural network 520 and generating an output value for the increment. Neural-network-based segmentation analyzer 518 can also be configured to generate an output vector comprising the output values for the respective increments; determine a maximum (relative or absolute) in the generated output vector; and identify a location of the maximum as the boundary between the characters. Neural-network-based segmentation analyzer 518 can also be configured to identify a plurality of relative maxima and compare to a threshold as is discussed above with respect to FIGS. 1-4.

In some examples, the first and last one, two, three, or other number of values of the output function are disregarded so that locations where the image portion has already been segmented (e.g., at the beginning and end of the image portion) are not re-identified as boundaries.

The maximum width comparator 516 can be further configured to, upon determining that a width of an image portion is less than the threshold, provide the image portion to an output index. The output index includes or represents image portions that each contain a character. A value for the individual characters can be extracted through OCR techniques, and a document 520 including text representations of the characters can be generated.

System 500 can be thought of as a hybrid segmentation system. Depending upon the type of segmentation analyzer implemented as first segmentation analyzer 508, some boundaries between characters may not be properly detected. Maximum width comparator 516 can identify image portions that likely require further segmentation, and neural-network-based segmentation analyzer 518 can perform the additional segmentation.

While neural-network-based approaches tend to be more accurate than other segmentation approaches, neural-network-based approaches can be undertrained (causing some boundaries not to be detected) or overtrained (causing non-existent boundaries to be detected). The hybrid segmentation approach shown in FIG. 5 (and FIG. 6) can mitigate the impact of under/over training by, for example, first segmenting using a different (e.g., cross-correlation) approach and then using a neural-network-based approach to segment any image portions that may require additional segmentation. In such a hybrid approach, the overall accuracy is improved using the neural-network-based techniques while the impact of over/undertraining is limited by not performing all segmentation with the neural-network-based techniques.

Neural-network-based segmentation analyzer 518 can be further configured to provide the additional image portions generated based on the segmentation performed by neural-network-based segmentation analyzer 518 to the maximum width comparator to determine if any of the additional image portions exceed the width threshold. In some examples, such a process continues until a maximum number of iterations has been reached or until no image portions exceed the threshold.

First segmentation analyzer 508, maximum width comparator 516, neural-network-based segmentation analyzer 518, neural network 520, processor 502, memory 504, and data store 506 can be part of one or more computers 522 (e.g., a server or client computing device). Input images, image portions, training weights, thresholds, and other data can be stored by data store 506 and/or memory 504. Any of the various components of system 500 can be in communication with any other components of system 500.

Figure 6:
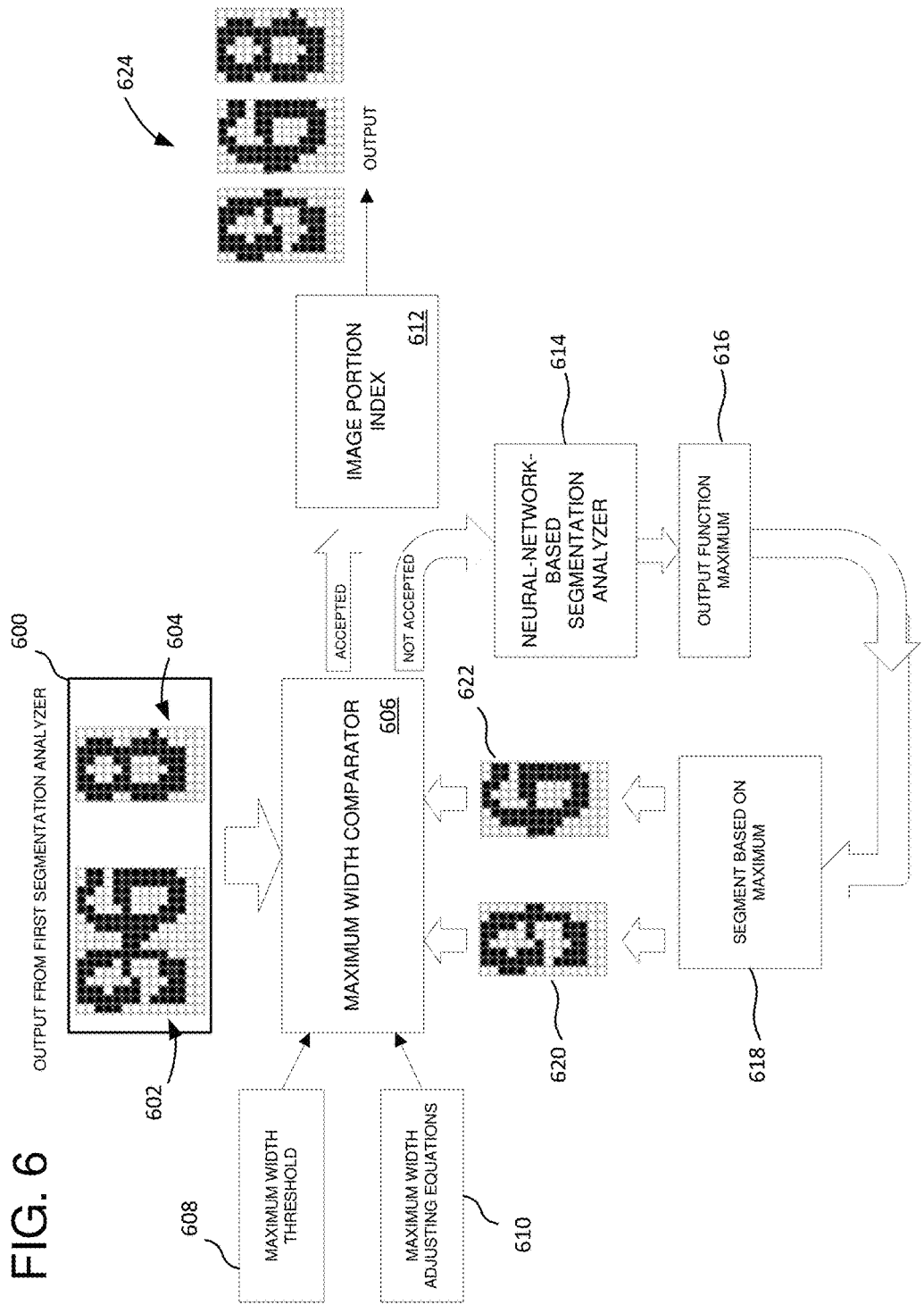
FIG. 6 illustrates operation of an example image segmentation system.

FIG. 6 illustrates the operation of an example image segmentation system such as system 500 of FIG. 5. Output 600 from a first segmentation analyzer, such as first segmentation analyzer 508 of FIG. 5, includes two image portions, image portion 602 and image portion 604. Image portions 602 and 604 are provided to a maximum width comparator 606, which can be similar to maximum width comparator 516 of FIG. 5. Maximum width comparator 606 applies a maximum width threshold 608, which can be a maximum expected width for a single character. In some examples, multiple maximum expected widths are used for different types of characters or areas of an image. Maximum width adjusting equations 610 can be provided to maximum width comparator 606 in some examples. Maximum width adjusting equations 610 can be used to dynamically adjust maximum width threshold 608 in response to, for example, a number of iterations needed to completely segment received image portions. Maximum width adjusting equations 610 can, for example, be made to be dependent on the dots-per-inch of the input image.

Image portions that are less than maximum width threshold 608 (e.g., image portion 604) are provided as output. For example, the image portions can be inserted into an image portion index 612 or an output list of image portions (not shown). For image portions that exceed maximum width threshold 608 (e.g., image portion 602), the image portions are provided to a neural-network-based segmentation analyzer 614, which can be similar to neural-network-based segmentation analyzer 518 of FIG. 5. Neural-network-based segmentation analyzer 614 determines a maximum 616 of an output vector. Maximum 616 can be the absolute maximum for the image portion or a relative maximum. The image portion is then segmented along a boundary indicated by the output vector maximum in process block 618, resulting in additional image portion 620 and additional image portion 622. Additional image portions 620 and 622 are then provided back to maximum width comparator 606 and again compared to maximum width threshold 608. In FIG. 6, additional image portions 620 and 622 are below maximum width threshold 608 and are thus provided to image portion index 612. Image portion index 612 can be used to generate an output 624 comprising the plurality of image portions that can be provided to an OCR system.

In FIG. 6, the segmentation resulting in additional image portions 620 and 622 resulted in both image portions being less than maximum width threshold 608. Additional iterations can be used to segment additional image portions even further when one image portion exceeds maximum width threshold 608. For example, image portion 602 includes two characters connected by noise pixels, but an image portion can also contain three, four, or other number of characters connected by noise pixels. In such cases, one boundary can be identified by neural-network-based segmentation analyzer in each iteration (e.g., when one maximum is identified in the output function). In some examples, rather than performing multiple iterations, multiple maxima are identified and compared to a threshold as discussed above with respect to FIGS. 1-4.

FIG. 7 illustrates a cross-correlation-based segmentation technique that can be implemented, for example, by first segmentation analyzer 508 of FIG. 5. "Cross-correlation" can refer to a measure of similarity of two waveforms as a function of a time-lag applied to one of them. Cross-correlation can also refer to the sliding dot product or sliding inner-product. Cross-correlation can be used, for example, to search for a short, known features within a longer signal. For continuous functions f and g, the cross-correlation can be defined as:

$$(f * g)(\tau) \overset{def}{=} \int_{-\infty}^{\infty} f^*(t)g(t+\tau)dt, \quad (1)$$

$$(f * g)(\tau) \overset{def}{=} \int_{-\infty}^{\infty} f^*(t)g(t+\tau)dt, \quad (2)$$

In equations 1 and 2, f* denotes the complex conjugate of f, and t represents time lag. Similarly, for discrete functions, the cross-correlation can be defined as:

$$(f * g)[n] \overset{def}{=} \sum_{m=-\infty}^{\infty} f^*[m]g[m+n]. \quad (3)$$

FIG. 7 shows a 1×n pixel moving window 700 that increments one pixel per iteration across an input image 702 (shown as f[i]). For the respective steps, the contents of window 700 are compared to a blank window 704 (shown as g[i]) of the same size as window 700 used as a kernel. At each step, a cross-correlation output value is computed in process block 706 (shown as O[i] in FIG. 1). The individual values for the steps form an output vector (O). A plot 708 of the output vector is shown superimposed on input image 702. Locations in the output vector where the cross correlation is high are shown as relative maxima in plot 708. Relative maxima that meet or exceed a threshold 710 are identified as boundaries between characters. That is, the more similar the pixels at an x-location are to a blank window, the more likely that location is a boundary. This can be seen in plot 708 where the highest maxima correspond to columns without any black pixels. In some examples, threshold 710 can be set high (as illustrated in FIG. 7) such that a cross correlation of 1 or nearly 1 determines that a location is to be considered a boundary. In such cases, columns only comprising blank pixels (no black pixels) are identified as boundaries between characters.

The locations of the relative maxima that meet or exceed the threshold are identified as boundaries 712, 714, 716, and 718. Image 702 can then be segmented along boundaries 712, 714, 716, and 718, and characters within the respective segmented portions can be identified using, for example, OCR techniques. Unlike the neural-network-based approach illustrated in FIG. 3, in FIG. 7, the boundary between the 9 and the 6 is not detected because of the presence of noise pixels.

FIG. 7 illustrates a process similar to FIG. 3 for identifying relative maxima, comparing to a threshold, and identifying boundaries through blocks 720, 722, and 724. Block 720 illustrates the first derivative of the output vector O'[i]. The function M[i], shown in block 722 represents relative maxima, where for each i value, a 1 is determined if either (a) the sign (+/−) of the first derivative of the output vector at i is positive and the sign of the first derivative of the output vector at i+1 is negative (indicating an increasing function at i and a decreasing function at i+1, with a relative maximum between i and i+1) or (b) the first derivative is zero (indicating no change in the output function and a relative maximum). The function P[i] shown in block 724, represents the boundaries, where a value of 1 is determined if a maximum has been detected and the output vector at that i value exceeds the threshold and 0 otherwise.

Figure 8:
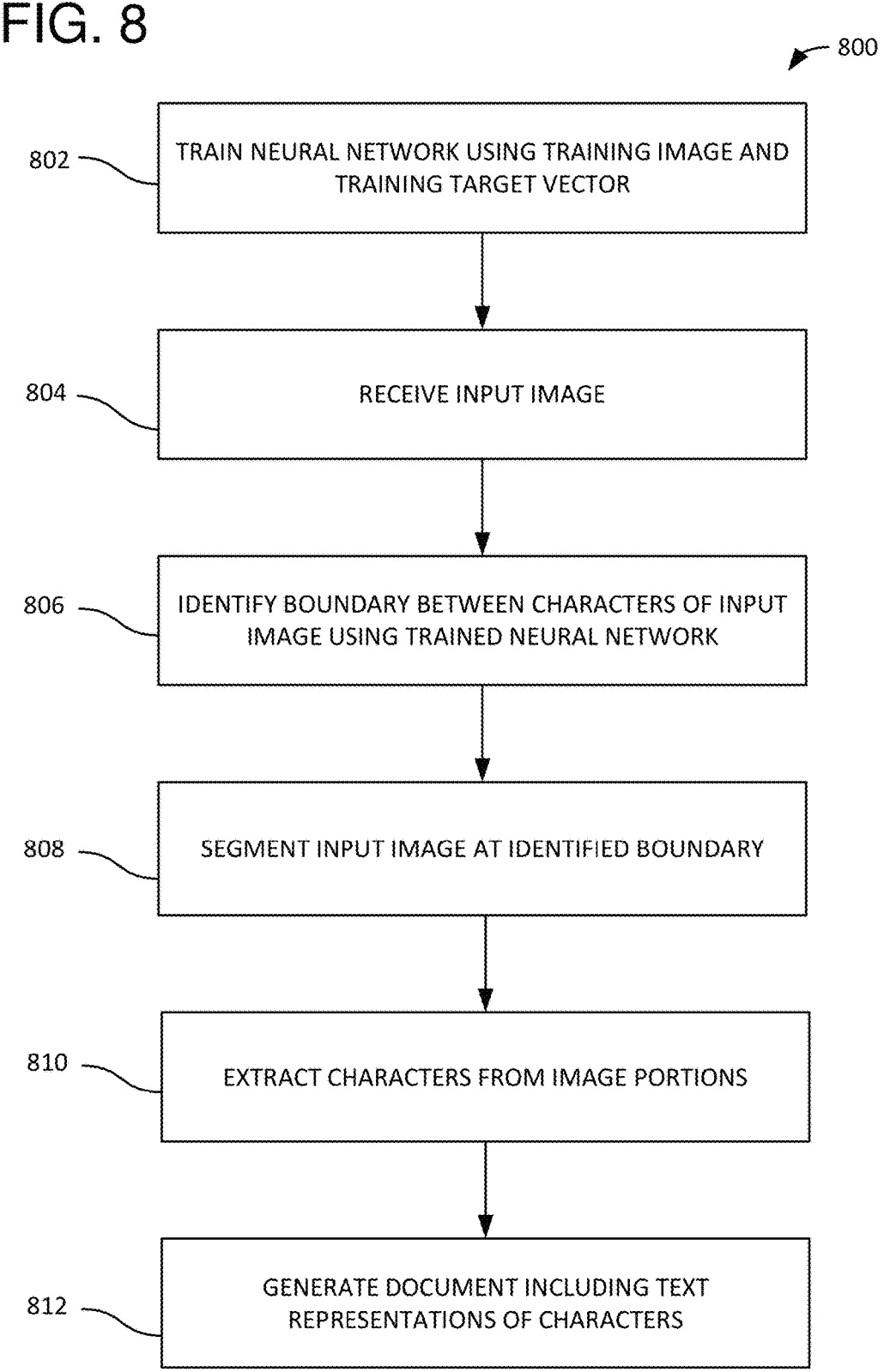
FIG. 8 illustrates an example method of training a neural network and using the trained neural network to segment a received input image.

FIG. 8 illustrates a method 800 for segmenting images. In process block 802, a neural network is trained using a training image and a training target vector. The training target vector indicates one or more boundaries between characters in the training image. In process block 804, an input image is received. In process block 806, a boundary is identified between characters of the input image using the trained neural network. In process block 808, the input image is segmented at the boundary identified between the characters to form image portions. A character is extracted from the respective image portions in process block 810. In process block 812, a document that includes text representation of the characters is generated.

Figure 9:
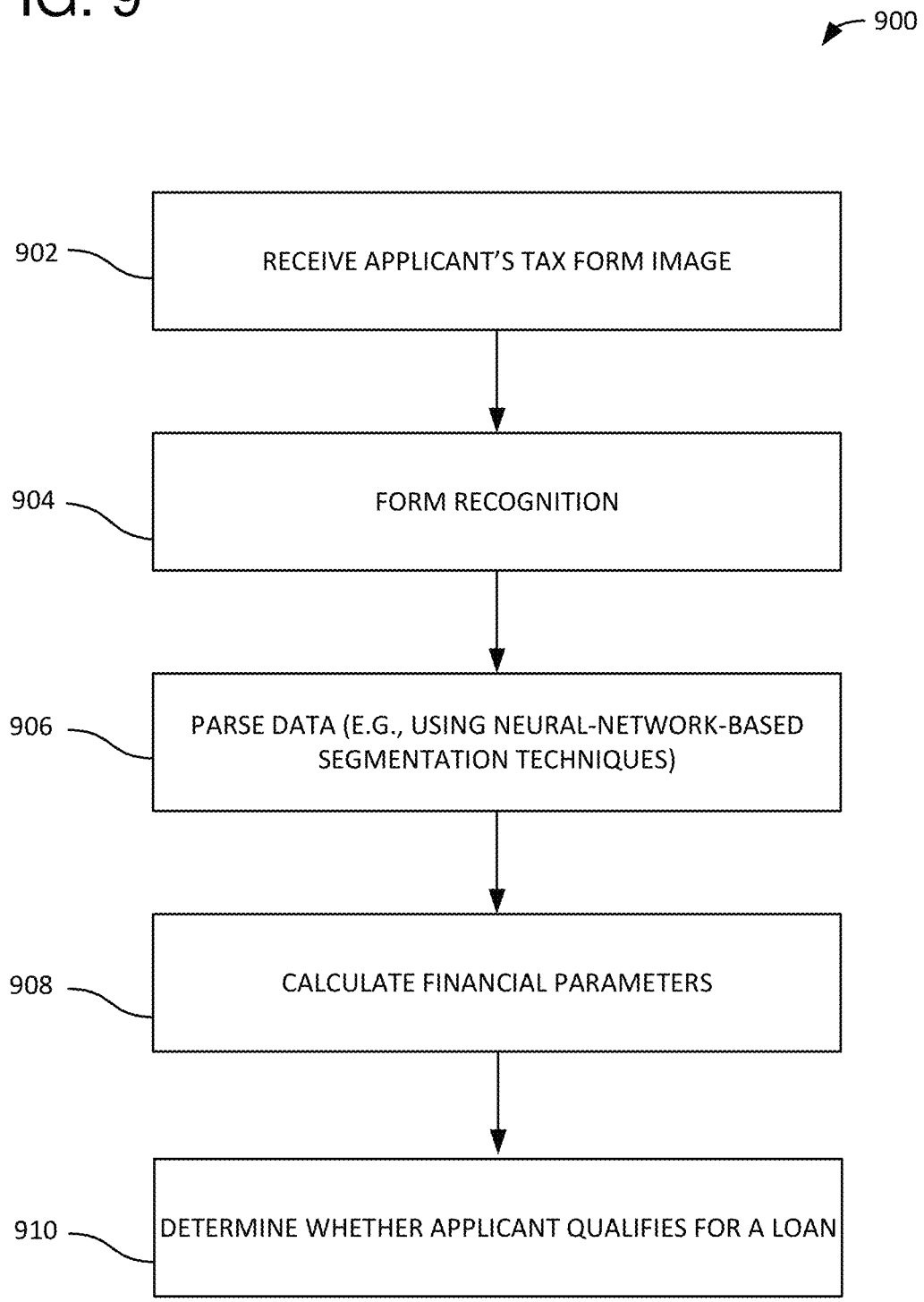
FIG. 9 illustrates an example application of using neural-network-based image segmentation.

The neural-network-based segmentation techniques and systems described herein can be implemented in a variety of contexts, including web-based services and cloud services. For clarity, FIG. 9 illustrates one specific example—a method 900 of processing, evaluating, and approving a loan application of an applicant. In process block 902, an image of a prepared tax form is received. The image can be generated using a camera, optical scanner (e.g., scanning a hard copy form), or other optical sensor. For example, the applicant's previous year's tax forms can be received, or the applicant's last two years of tax forms can be received, or the applicant's last five years of tax forms can be received, or the applicant's last ten years of tax forms can be received.

In process block 904, a form recognition process is performed to recognize which of a set of standardized tax forms corresponds to the image. For example, the standardized tax forms can include U.S. federal tax forms, U.S. state tax forms, or tax forms of any jurisdiction of interest. As one specific example, the set of standardized tax forms can include U.S. federal tax forms 1040, 1040A, 1040ES, and/or 1040EZ. The form recognition process can be performed in a variety of manners and can involve comparing known characteristics of the standardized form against characteristics of the image. Form recognition can involve image segmentation using neural-network-based segmentation techniques.

A data parsing process is performed in process block 906 based on known characteristics of the recognized form. The data parsing extracts data of interest from the image. For example, data of interest in the processing, evaluating, and approving a loan application of the applicant can be extracted. As one specific example, the applicant's name, social security number, filing status, and/or income information (including, but not limited to, wages, salaries, tips, taxable interest, tax exempt interest, ordinary and qualified dividends, alimony, business income, capital gains, IRA distributions, pensions and annuities, farm income, unemployment compensation, social security benefits, and/or other income) can be extracted.

The process of extracting the data of interest from the received tax forms can include neural-network-based segmentation techniques and systems as well as OCR techniques to identify characters in image portions segmented from the image. Once the data of interest has been extracted from the received tax form, the data of interest can be displayed or used by a computer to calculate financial parameters of the applicant in process block 908. The financial parameters are compared by the computer, programmed to carry out the comparison, against baseline, benchmark, or threshold values. Based on the comparison, in process block 910, it is determined whether the applicant qualifies for a loan. The results can be displayed on a display or provided in an electronic, paper, or other report.

Example Computing Environments

Figure 10:
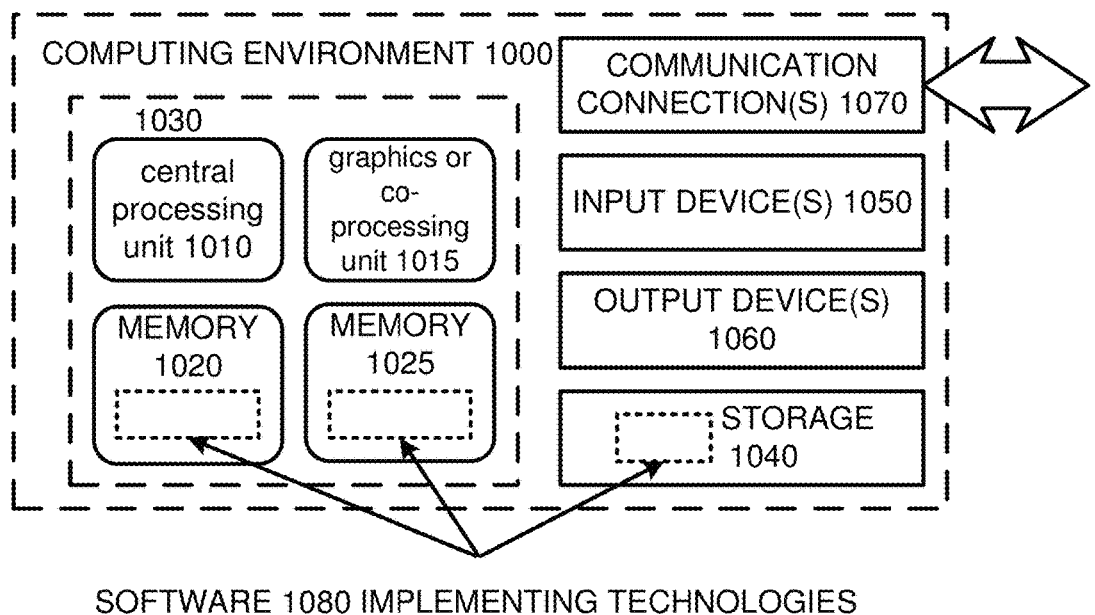
FIG. 10 is a diagram illustrating a generalized implementation environment in which some described examples can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, memory 1020, 1025 can store first segmentation analyzer 508, maximum width comparator 516, and neural-network-based segmentation analyzer 518 of FIG. 5.

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Cloud Computing Environments

Figure 11:
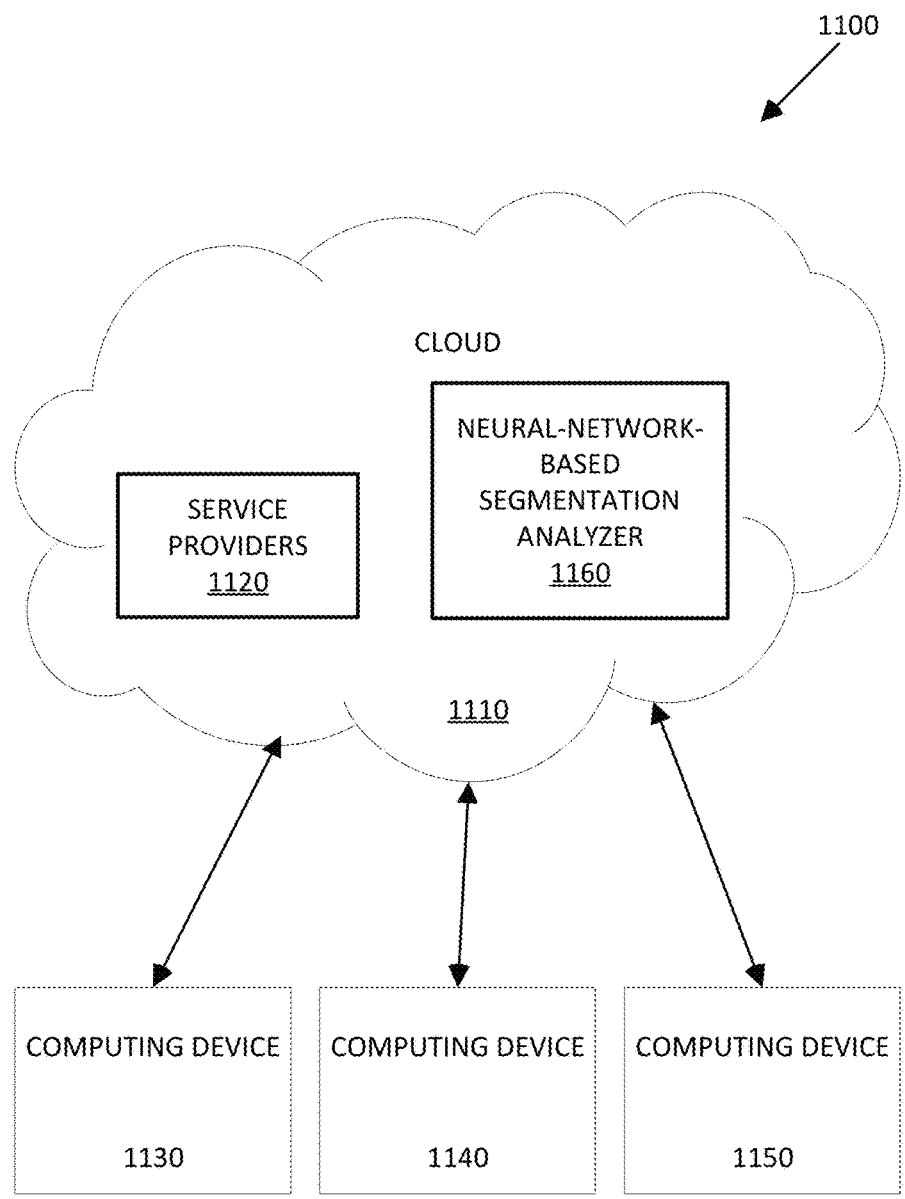
FIG. 11 is an example cloud computing environment that can be used in conjunction with the examples described herein.

In example environment 1100 of FIG. 11, the cloud 1110 provides services for connected computing devices 1130, 1140, and 1150. Services can be provided by the cloud 1110 through service providers 1120, or through other providers of online services (not depicted). For example, cloud services can be customized to the screen size, display capability, and/or touch screen capability of a particular connected device (e.g., connected computing devices 1130, 1140, 1150).

In example environment 1100, the cloud 1110 provides the technologies and solutions described herein to the various connected computing devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users). Cloud 1510 can provide, for example, neural-network-based segmentation analyzer 1160.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An image segmentation system, comprising:
   at least one processor; and
   one or more non-transitory computer-readable media storing computer-executable instructions for performing a method of image segmentation, the method comprising:
   accessing an input image comprising a plurality of characters;
   identifying, by the at least one processor, a segmentation boundary between two of the plurality of characters using a trained neural network, wherein identifying the segmentation boundary comprises:
   moving a window across the input image;
   for a plurality of window positions, analyzing pixels within the window using the trained neural network and generating an output value for the position; and
   evaluating the output values for a plurality of the positions; and
   segmenting, by the at least one processor, the input image at the boundary identified between the two characters.

2. The system of claim 1, wherein the segmenting creates an image portion containing one of the two characters, and wherein the method further comprises:
   extracting, by the at least one processor, a value for the character from the image portion; and
   generating, by the at least one processor, a document including a text representation of the character.

3. The system of claim 1, wherein the window is moved across the input image in a plurality of steps of a uniform size.

4. The system of claim 1, wherein the output value is associated with a horizontal location of the center of the window for the position.

5. The system of claim 1, wherein the output values generated for the respective positions form an output vector, and wherein evaluating the output values for a plurality of the positions comprises:
   determining one or more relative maxima in the output vector;
   comparing the one or more relative maxima to a threshold; and
   upon determining that one of the one or more relative maxima meets or exceeds the threshold, identifying a location of the relative maxima as the boundary between the two of the plurality of characters.

6. The system of claim 1, wherein analyzing pixels within the window using the trained neural network comprises:
   creating a one-dimensional input vector representing the pixels within the window; and
   providing the input vector to the trained neural network.

7. The system of claim 1, wherein the neural network is trained at least in part based on a training image and a training target vector, the training target vector indicating one or more boundaries between characters in the training image.

8. The system of claim 7, wherein the training target vector comprises values for a plurality of locations within the training image, wherein if a location of the plurality of locations is one of (i) a start of a next character or (ii) a boundary between characters, the corresponding value is first predetermined value, and wherein if a location of the plurality of locations is not one of (i) a start of a next character or (ii) a boundary between characters, the corresponding value is a value other than the first predetermined value.

9. The system of claim 1, further comprising an optical scanner configured to scan an input document and generate the accessed input image.

10. An image segmentation method, comprising:
    segmenting an input image;
    generating a plurality of image portions based on the segmenting;
    determining, for the respective image portions, if a width of the image portion exceeds an expected maximum width;
    for at least some of the respective image portions for which it is determined that the width of the image portion exceeds the expected maximum width:
    identifying a boundary between characters in the image portion using a trained neural network;
    segmenting the image portion at the boundary identified between the characters; and
    generating additional image portions corresponding to the segmented image portion.

11. The method of claim 10, further comprising upon generating the additional image portions corresponding to the segmented image portion, determining if the respective additional image portions exceed the expected maximum width.

12. The method of claim 11, further comprising upon determining that one of the additional image portions exceeds the expected maximum width, using the trained neural network to analyze the additional image portion.

13. The method of claim 10, wherein the neural network is trained at least in part based on a training image and a training target vector, the training target vector indicating one or more boundaries between characters in the training image.

14. The method of claim 10, wherein identifying the boundary between characters in the image portion using the trained neural network comprises:
- incrementally moving a window across the image portion;
- for respective increments:
  - analyzing pixels within the window using the trained neural network; and
  - generating an output value for the increment;
- generating an output vector comprising the output values for the respective increments;
- determining a maximum in the generated output vector; and
- identifying a location of the maximum as the boundary between the characters.

15. The method of claim 10, further comprising for image portions having a width less than the expected maximum width, providing the image portion to an output index.

16. The method of claim 10, wherein the input image is segmented based on a cross-correlation between a blank moving window and the input image.

17. One or more non-transitory computer-readable media storing computer-executable instructions for performing a method, the method comprising:
- training a neural network using a training image and a training target vector, the training target vector indicating one or more boundaries between characters in the training image;
- receiving an input image;
- identifying a boundary for segmentation between characters of the input image using the trained neural network, wherein identifying the boundary comprises:
  - moving a window across the input image in a plurality of steps;
  - for the respective steps, analyzing pixels within the window using the trained neural network and generating an output value for the step; and
  - evaluating the output values for at least some of the steps;
- segmenting the input image at the boundary identified between the characters to form image portions;
- extracting a character from the respective image portions; and
- generating a document including text representation of the characters.

18. The non-transitory computer-readable media of claim 17, wherein training the neural network comprises:
- moving a window across the training image in a plurality of steps; and
- for the respective steps:
  - converting contents of the window into an input vector; and
  - modifying at least one weighting value of a set of weighting values based on the input vector and a value of the training target vector corresponding to the location of the window.

19. The non-transitory computer-readable media of claim 17,
wherein the output value for a respective step is associated with a horizontal location of the center of the window, wherein the output values generated for the respective steps form an output vector, and wherein evaluating the output values for at least some of the steps comprises:
- determining one or more relative maxima in the output vector;
- comparing the one or more relative maxima to a threshold; and
- upon determining that one of the one or more relative maxima meets or exceeds the threshold, identifying a location of the relative maxima as the boundary for segmentation between characters.

20. The non-transitory computer-readable media of claim 17, wherein the input image is an image portion of a previously segmented image, and wherein the image portion is provided as the input image upon determining that the image portion is greater than a predetermined maximum expected width.

* * * * *

UNITED STATES PATENT AND TRADEMARK OFFICE
CERTIFICATE OF CORRECTION

PATENT NO. : 9,646,230 B1
APPLICATION NO. : 15/174926
DATED : May 9, 2017
INVENTOR(S) : David Prulhiere Page 1 of 1

It is certified that error appears in the above-identified patent and that said Letters Patent is hereby corrected as shown below:

In the Claims

Column 14, Line 35, "first predetermined value" should read – a first predetermined value –.

Signed and Sealed this
First Day of August, 2017

Joseph Matal
*Performing the Functions and Duties of the*
*Under Secretary of Commerce for Intellectual Property and*
*Director of the United States Patent and Trademark Office*